June 19, 1923.  1,459,644
G. W. WATSON
APPARATUS FOR MEASURING PRODUCTS OF TWO VARIABLE QUANTITIES
Filed Feb. 1, 1922  2 Sheets-Sheet 1

Inventor
George William Watson
By B. Singer, Atty

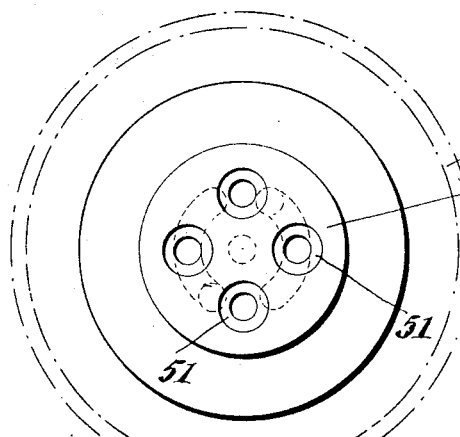
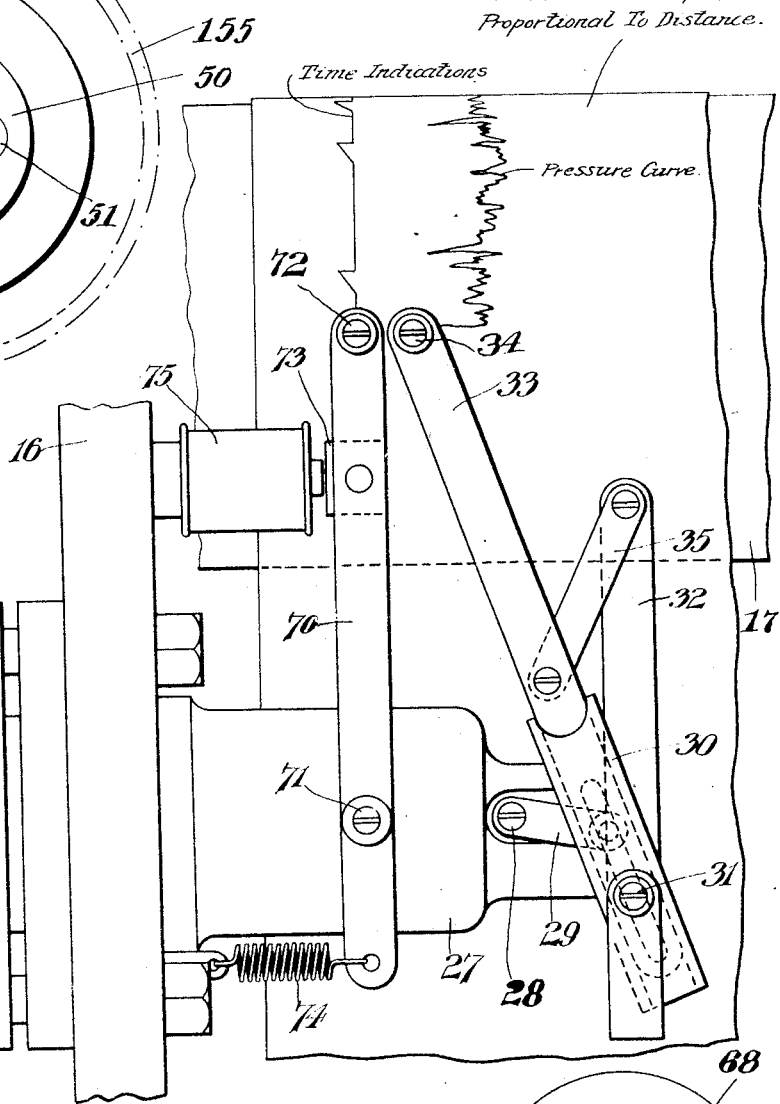
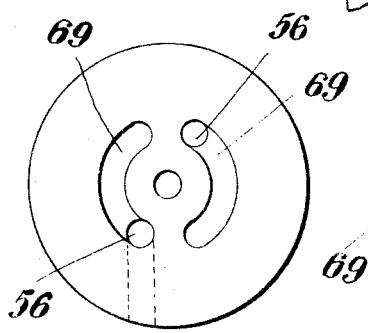
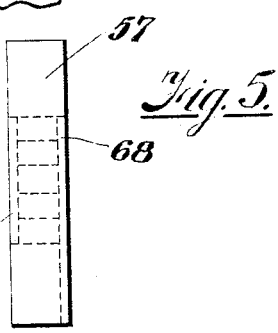
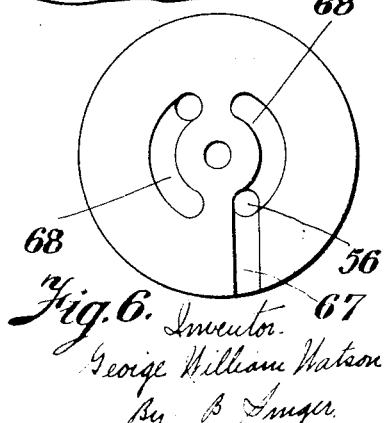

Patented June 19, 1923.

1,459,644

UNITED STATES PATENT OFFICE.

GEORGE WILLIAM WATSON, OF LONDON, ENGLAND.

APPARATUS FOR MEASURING PRODUCTS OF TWO VARIABLE QUANTITIES.

Application filed February 1, 1922. Serial No. 533,484.

*To all whom it may concern:*

Be it known that I, GEORGE WILLIAM WATSON, a subject of the King of Great Britain, residing at 50 Pall Mall, London, S. W. 1, England, have invented new and useful Improvements in or Relating to Apparatus for Measuring Products of Two Variable Quantities, of which the following is a specification.

This invention consists in improvements in or relating to apparatus for measuring products of two variable quantities.

According to the present invention a device for measuring the product of two variable quantities, such as a pressure and a distance over which that pressure operates, comprises in combination two members so formed as to be movable respectively and proportionately with the value of said two quantities, a pump or its "equivalent" driven by one of said members, and means operatively connected with the other member for varying the output of the pump, with or without a quantity meter for measuring said output.

Preferably the pump is of a variable-throw type and the means for carrying its output operates to vary the throw of the pump.

In one form of the invention the pump comprises one or more plungers each fitting within a pump-barrel formed in or carried by a rotatable carrier with means to move each plunger in one direction against a cam-member which engages the end of the plunger and is so constructed that the operative pitch of the cam can be varied by means of an operative connection with the pressure-controlled means aforesaid whereby the pitch of the cam, and consequently the throw of the plunger, is varied in accordance with the pressure-variations. The cam-member may take the form of a plate against which the plunger abuts, which is so mounted that it can be tilted to varying degrees of inclination to the axis of rotation aforesaid and is operatively connected with the pressure-controlled means whereby its inclination is varied in accordance with the pressure-variations.

The invention also includes other features, for example a hydraulic motor to be driven by the outflow from said pump and a meter operated by said motor, and a chart for receiving impressions from a recording device from the pressure-controlled device, with or without means for producing also a time record on the chart.

One preferred form of the invention as applied to the measurement of the product of a pressure and a distance over which that pressure operates will now be described by way of example, with reference to the accompanying drawings in which:—

Figure 2 shows in outside elevation the chart and means for obtaining a record thereon.

Figure 3 is a detail plan of the plug 50.

Figure 4 is a similar view of the port plate 57.

Figure 5 is a detail side elevation of the same.

Figure 6 is a detail plan of the same, showing the reverse side to that shown in Figure 4.

Like reference numerals denote like parts in both figures.

Figure 1:
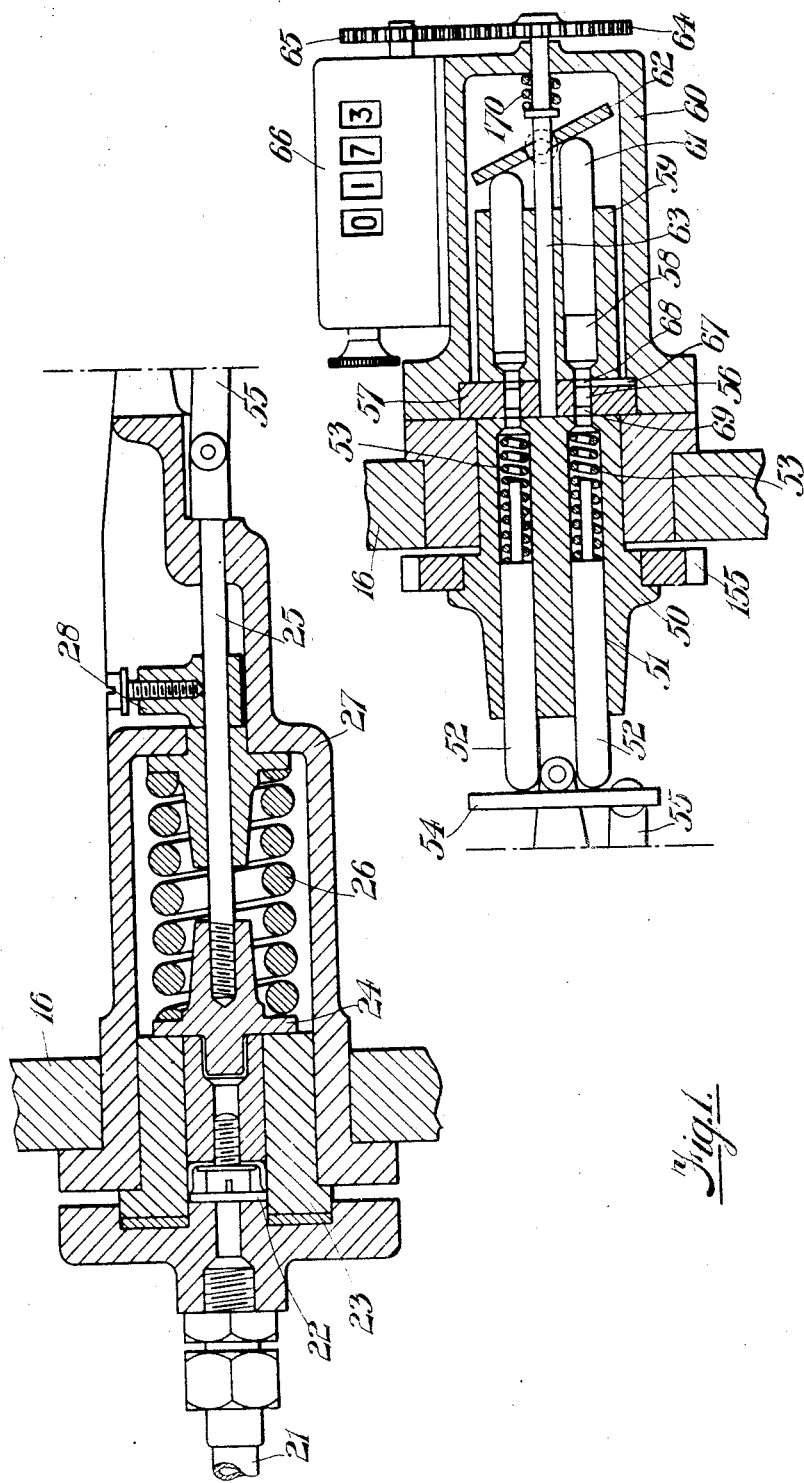
Figure 1 is a sectional elevation of the pump and associated parts, the port 57 being shown not in true section.

In this example the pressure to be measured is transmitted by means of a conduit 21 to fluid within that conduit. This conduit communicates with a cylinder 22 within which slides a piston 23. The piston 23 is moved outwardly through a distance proportional to the pressure exerted on the fluid in the conduit 21 and the cylinder 22. The outer end of the piston engages a flanged member 24 carrying a spindle 25, and outward movement of the piston and spindle is resisted by means of a spring 26. The spring and cylinder are enclosed within a casing 27 which is carried in a frame 16—hereinafter called the instrument frame. Movement of the spindle 25 is transmitted through a crosshead 28 to a recording stylus for the purpose of obtaining a record upon a paper chart of pressure and pressure variations—the operation of this part of the mechanism will be more fully described hereinafter.

Mounted for rotation within a bushing carried by an end plate of the frame 16 is a cylindrical plug 50 within which four cylindrical cavities 51 are bored, the axis of each of which is parallel with the axis of the plug 50 but is spaced apart therefrom. The four cavities are uniformly disposed around the plug and within each of them fits a pump-plunger 52, the cavities constituting pump-barrels. The inner end of each plunger is engaged by one end of a coiled spring 53 the opposite end of which bears against the inner end of the corresponding barrel whereby the plungers are normally pressed outwardly by the springs. The outer ends of the plungers, which are rounded for anti-friction purposes, are pressed outwardly by the springs 53 into contact with a cam-plate 54 which is pivotally mounted on an extension of the casing 27 in order to swing about an axis which is at right angles to and intersects the axis of the plug 50. The lower end of the cam plate is connected by means of a link 55 to the outer or free end of the spindle 25. The plug 50 is rotated by means of a gear-wheel 155, the angular movement of which is proportional to the distance over which the pressure to be measured operates. Where, for example, the instrument is to be used for measuring the work done by a tractor the gear-wheel 155 would conveniently be driven by one of the tractor wheels or alternatively by a trailing-wheel of known circumferential dimensions. When no pressure is applied to the fluid in the cylinder 22 the face of the cam-plate 54 is perpendicular to the axis of rotation of the plug 50, but it will be seen that when pressure is applied the cam-plate will be tilted to an angle proportional to the pressure exerted. Thus movement of the spindle 25 will vary the degree of tilting of the plate and it will be obvious that if the cylindrical plug be rotated the plungers carried thereby will be constantly oscillated in their barrels. As the plug is rotated each plunger will travel over the surface of the plate from a position at which the plate is nearer the plug to a position at which it is further away therefrom, and back again, the springs forcing the plungers outwardly and the inward movement being brought about by the pressure of the inclined plate against the outer end of the plungers as the latter are rotated.

Each of the barrels 51 communicates at its inner end by way of ports 56 in a fixed port-plate 57 to four corresponding barrels 58 formed in a second plug 59 mounted so as to be capable of rotating within a casing 60 about an axis coincident with that of the plug 50. Within the barrels in the second plug is a corresponding number of pistons 61 the outer ends of which bear against a second cam-plate 62 fixed within the casing 60. The second cam-plate 62 is so mounted within the casing that its inclination to the axis of rotation of the plug may be adjusted to any desired degree and then fixed. To the plug 59 is centrally secured a spindle 63 journalled at one end in the port-plate and at the other in the casing 60, through which it passes. To the outer end of this spindle is attached a gear-wheel 64 which transmits motion to a second gear-wheel 65 mounted on the driving spindle of a standard form of revolution-counter 66. The inner ends of both sets of barrels and the passages in the port-plate communicating there-between are filled with fluid. The interior of the casing 60 is also filled with fluid and communicates with the ports in the port-plates by means of a duct 67 which in turn is in open communication with the lower of two crescent-shaped recesses 68 formed in the face of the port-plate 57. The two recesses 68 are arranged concentrically on the port-plate, one occupying the upper portion of the plate and the other the lower portion. The recesses are separated one from the other by narrow strip metal which is flush with the face of the port-plate. The opposite face of the port-plate is similarly formed with two crescent-shaped recesses 69, and the two sets of recesses communicate with each other by means of throughway ports 56 referred to above. There are two of these through-way ports, one connecting the upper pair of recesses on opposite sides of the port-plate and the other communicating between the lower pair of recesses. The through-way between the lower recess 68 the lower port 56, and the lower recess 69, constitute a suction connection for the variable throw pump 50, while the upper set of passages constitute the delivery conduit for said pump. It will be seen, therefore, that as fluid is pumped by each of the plungers 52 in turn the plungers 61 will be forced outwards against the cam-plate 62, and thereby rotary motion will be transmitted to the plug 59, and by means of the spindle 63 to the revolution-counter 66. A spring 170 is provided in order to maintain the face of the plug 59 in close contact with the corresponding face of the port-plate 57.

It will be appreciated that as the angular movement of the plug 50 is directly proportional to the distance through which the pressure operates, and as the cam-plate 54 assumes an inclination proportional to the amount of that pressure, the output of the pump-unit constituted by the plungers 52 and corresponding barrels, will thus be directly proportional to the product of the two quantities to be measured—that is, in this case, to the product of pressure and distance, or in other words, the work done. Moreover, angular movement of the spindle 63 is proportional to the output of the aforesaid pump-unit and therefore constitutes a measure of the work performed, and it will be seen therefore that the revolution-counter may be calibrated to give a direct reading in work units. This work may, for example, be that performed at a draw-bar connection between a tractor and a plough or other form drawn thereby.

The plug 59 and plungers 61 constitute a hydraulic motor driven by the alternate pressure and suction strokes of the pump 50, that is to say a motor energized by the power output of the pump, the motor casing 60, the barrels 51 and 58 and the passages communicating therebetween constituting a closed fluid circuit.

The means for obtaining records on a paper chart will now be described.

Outward movement of the cross-head 28 is transmitted through a link 29 to a stylus-lever-carrier 30 which in turn is pivotally mounted at 31 on a plate 32 rigid with the frame. Slidably mounted within the carrier 30 is a stylus-lever 33 which carries at its outer end an adjustable stylus-point 34. The stylus-lever itself is operatively connected to the plate 32 by means of a link 35 pivotally connecting these two members. By these connections movement to the cross-head 28 is proportionately increased at the stylus 34 to which an approximately straight-line motion is also transmitted. The stylus-point bears upon the surface of a roll of paper which is caused to travel over a cylindrical surface 17 at any desired speed, preferably, a speed proportional to the distance through which the pressure to be measured operates. The means for conveying the paper chart over the cylinder 17 are not shown in the drawings and form no part in the present invention. It will be seen however, that the means described provide for a record being made on paper of the pressure to be measured and variations in that pressure.

In order also to provide on the paper roll a record of the time occupied during any particular test the following mechanism is provided:—

A second stylus-lever 70 is pivotally mounted at 71 on the outside of the casing 27. One end of this lever carries a stylus-point 72 which bears upon the paper roll aforesaid at a point in line with the stylus 34 which records the pressure. Intermediate the stylus-point and pivot centre of the lever 70 the latter carries a soft-iron pole-piece 73 while the end of the lever remote from the stylus-point is linked by means of a tension-spring 74 to the instrument frame. This spring tends normally to keep the pole-piece out of contact with an electro-magnet 75 secured to the frame. The electro-magnet 75 is energized by a battery circuit (not shown) the current in which is interrupted by a clockwork mechanism (not shown). The electric circuit is normally open but by means of the clockwork mechanism is momentarily closed at equal intervals of time. When the circuit is closed the pole-piece is attracted by the magnet, and the stylus-point, which normally inscribes a straight-line on the paper roll, makes a sideways diversion or kink from this line.

As the paper is being moved at a speed proportionate to the distance through which the pressure operates, it is therefore possible to calculate from the distance between the kinks on the time line, the distance travelled at any desired point on the record made on the paper.

It will be seen that when the apparatus hereinbefore described a chart will be obtained bearing two records, one of time and another of pressure. From this chart and from the indications of the revolution-counter not only is a record of the product of two variable quantities obtained but also a record of the individual variations of these quantities.

It will be realized that any device the output of which can be varied proportionately to the product of the pressure and the distance travelled may be employed in place of the pump unit herein described in detail, and such device is to be understood to be the "equivalent" referred to at the commencement of this specification and in the claims. Such an equivalent device might take the form of an electric generator or like mechanism controlled by similar parts to those by which the pump has been describ as controlled in the above description.

The constructions described in the foregoing admit of many modifications without departing from the spirit of the invention. For example, any convenient form of hydraulic motor driven by the outflow from the pump may be employed—such as two vaned wheels rotating about parallel axis with the vanes adapted to intermesh. It is also to be understood that the pump-plungers 52 may if desired be radially disposed in the plug 50, in this case the cam-plate 54 would either be arranged to encircle the plug and to co-operate with the outer ends of the plungers, or the plug would be hollow at its centre and have disposed within this hollow centre part the cam-plate. In each of these cases the springs opposing movement of the plungers by the cam-plate would be located at the ends of the plungers remote from said plate.

I claim:—

1. A device for integrating one magnitude (such as the measure of a force) with respect to another magnitude (such as the traverse of the point of application of the force), comprising a member mounted to move proportionately to changes in each of said magnitudes, a pump driven by one of said members and provided with means responsive to the movements of the other member to vary the output of said pump, and means for measuring said output.

2. A device for integrating one magnitude (such as the measure of a force) with respect to another magnitude (such as the traverse of the point of application of the force), comprising a member mounted to move proportionately to changes in each of said magnitudes, a pump driven by one of said members and provided with means responsive to the movements of the other member to vary the output of said pump, and means for measuring said output, said pump being of a variable-throw type, and the means for varying the output of the pump being means for varying the throw thereof.

3. A device for integrating one magnitude with respect to another as claimed in claim 1, wherein the pump comprises one or more plungers each fitting within a pump barrel formed in or carried by a rotatable member provided with means to move each plunger in one direction against a cam-member which abuts the end of the plungers which is so constructed that the operative pitch of the cam can be varied by means of an operative connection with the pressure-controlled means aforesaid whereby the pitch of the cam and consequently the throw of the plunger, is varied in accordance with the pressure variations.

4. A device for integrating one magnitude with respect to another, as claimed in claim 1, wherein said means for measuring said output consists in a motor driven by the outflow of said pump.

5. A device for integrating one magnitude with respect to another, as claimed in claim 1, wherein said means for measuring the output of said pump consists in a hydraulic motor comprising plungers and barrels corresponding to those of the pump aforesaid and supported in a second rotatable carrier, a cam plate inclined to the axis of rotation of said second carrier and abutting the outer ends of the plungers therein, and fluid communicating means between the barrels of the pump and those of the motor for the purpose described.

6. A device for integrating one magnitude with respect to another, as claimed in claim 1, in combination with a chart and means to produce thereon a record of pressure variations.

7. A device for integrating one magnitude with respect to another, as claimed in claim 1, in combination with a chart and means to produce thereon a record of pressure variations, and means to also produce a time run on the chart.

In witness whereof I affix my signature.

GEORGE WILLIAM WATSON.